Nov. 7, 1939.  K. SCHENCKE  2,179,426
STAND HEAD
Filed Aug. 30, 1937
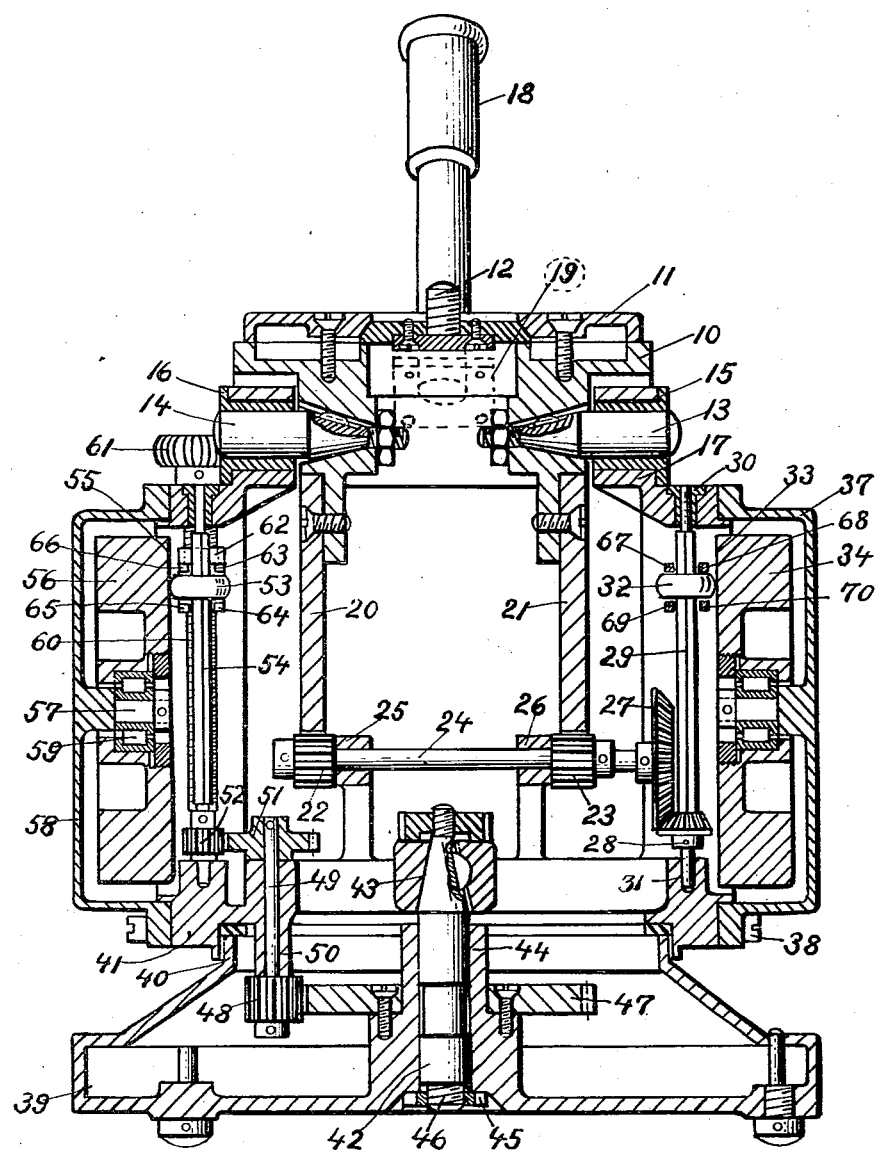
Inventor:
Karl Schencke Patented Nov. 7, 1939

2,179,426

UNITED STATES PATENT OFFICE 2,179,426

STAND HEAD

Karl Schencke, Berlin-Tempelhof, Germany, assignor to Askania-Werke A. G., a corporation of Germany Application August 30, 1937, Serial No. 161,681
In Germany August 29, 1936

4 Claims. (Cl. 248—183)

(Granted under the provisions of sec. 14, act of
March 2, 1927; 357 O. G. 5)

This invention relates to stand heads for tripods or the like on which cameras may be mounted for movement about one or several axes.

It has been proposed, as far as I am aware, to provide a stand head for moving picture cameras with a gear and a flywheel for steadying the relative motion of the camera and the tripod. The conventional stand heads were either provided with fixed flywheels permitting only one degree of steadying or with a set of interchangeable flywheels of different weight or diameter for adjusting the steadying action to the rate of the desired movement. The exchange of the flywheels in the conventional stand heads is very disadvantageous as several sets of flywheels are required for each stand head and the replacement takes considerable time.

It is therefore an object of this invention to provide a stand head steadied by flywheels in which the steadying action of the flywheels is easily adjustable without a loss of time.

Further aims, objects and advantages of this invention will appear from a consideration of the description which follows with the accompanying drawing showing, for purely illustrative purposes, an embodiment of this invention. It is to be understood, however, that the description is not to be taken in a limiting sense, the scope of the invention being defined in the appended claims.

Referring to the drawing:

The figure shows in sectional elevation a stand head according to this invention. A table 10 provided with a top plate 11 and a threaded stem 12 in the center thereof for receiving the mounting nut of a camera is mounted for tilting movement with its pivots 13 and 14 in bearings 15 and 16 of a supporting casing 17. The table may be provided with a handle 18 shown as secured to the table at 19 for imparting a movement to the same. The table is provided with rack sectors 20 and 21 meshing with pinions 22 and 23 secured to a shaft 24 and mounted in bearings 25 and 26 of the casing 17. A bevel gear 27 is secured to the shaft 24 and meshes with a second bevel gear 28 secured to a vertical shaft 29 mounted in the casing 17 in bearings 30 and 31. A friction wheel 32 is mounted on the shaft 29 for axial displacement, but is prevented from rotary movement relatively to the shaft 29. For this purpose, the shaft is shown as being of rectangular cross-section. The friction wheel 32 engages a plane surface 33 of a flywheel 34 mounted in antifriction bearing 35 on a stub shaft 36. The stub shaft is secured to or integral with a flywheel casing 37 secured to the supporting casing 17 by means of screws 38.

The supporting casing 17 is mounted for turning movement about an axis substantially perpendicular to the axis 13—14 in a base 39. The base is shown as having a circumferential flange 40 fitting into a corresponding flange 41 of the casing 17. As a rotary mounting between the casing and the base there is shown a shaft 42 secured to the casing 17 at 43 and rotatable in a bearing 44 on the base. A nut 45 may be provided on a threaded extension 46 of the shaft 42 preventing a disengagement of the shaft and the bearing 44. A gear 47 is stationarily mounted on the base meshing with a pinion 48 secured to a shaft 49 and mounted for rotation in a bearing 50 of the supporting casing 17. A further gear 51 is secured to the shaft 49 meshing with a pinion 52 driving a friction wheel 53 which is also mounted for axial displacement on a shaft 54. The friction wheel 53 engages a plane surface 55 of a second flywheel 56 mounted on a stub shaft 57 of the casing 58 by means of an antifriction bearing 59.

For displacing the friction wheel 53 relatively to the flywheel 56 there is provided a manually operable device shown in the illustrated example as being a threaded shaft 60 rotatable by means of a milled knob 61. Axially movable on the threaded shaft 60 is a nut 62 having four extensions 63, 64, 65, and 66 for displacing the friction wheel. Upon turning of the knob 61 the knob will move the friction wheel axially with respect to the shaft 54, thereby varying the ratio of transmission between the shaft 54 and the flywheel 56. For adjusting the ratio of transmission of the first friction wheel 32 and flywheel 34 a similar device is provided appearing in section in the drawing as extensions 67, 68, 69, and 70.

The operation of the device is as follows:

Upon turning movement of the table 10 about its vertical axis, the friction wheel 53 will be rotated by the shaft 54 and impart rotation to the flywheel 56. When the table or head is tilted about the horizontal axis through the shafts 13, 14, the flywheel 34 will be rotated by its friction wheel 32.

The inertia of the flywheels 34 and 56, respectively, prevents a jerky movement of the table 10 with respect to the base 39.

If it is desired to vary the steadying action of the flywheels it is only necessary to vary the ratio of transmission between the friction wheels and the flywheels.

Obviously the present invention is not restricted to the particular embodiments herein shown and described.

What is claimed is:

1. A stand head comprising, in combination, a stationary base; a table mounted thereon for movement about an axis; a flywheel; and change speed friction driving means for the flywheel comprising two rotatable members, one gliding on the other, one of said rotatable members being connected to be actuated by the movement of the table relative to said base and the other rotatable member being connected to actuate said flywheel, so that upon changing the position of said rotatable members relative to one another the speed of the flywheel may be varied, whereby the relative movement of the table and base may be steadied in a variable degree.

2. A stand head comprising, in combination, a stationary base; a table mounted thereon for movement about an axis; a flywheel having a friction face; and a change speed friction drive for the flywheel comprising a rotatable friction wheel gliding on said friction face and gearing connecting said friction wheel to be actuated by the movement of said table relative to said base, the speed of said flywheel being variable in accordance with the displacement of said friction wheel on said friction face, whereby the relative movement of the table and base may be steadied in a variable degree.

3. A stand head comprising, in combination, a stationary base; a table mounted thereon for movement about an axis; a flywheel having a friction face in the form of a disc; a change speed friction drive for the flywheel comprising a rotatable friction wheel gliding on said disc; and means connecting the rotatable friction wheel to be actuated by the movement of said table relative to said base and actuating said flywheel, the speed of said flywheel being variable in accordance with the displacement of said friction wheel on said disc, whereby the relative movement of the table and base may be steadied in a variable degree.

4. A stand head comprising, in combination, a stationary base; a table mounted thereon for tilting and turning movement about two axes substantially at right angles to each other; a first flywheel; a first change speed friction drive comprising a rotatable friction wheel engaging and gliding on one side of said first flywheel; means connecting the rotatable friction wheel to be actuated by the tilting movement of said table on said base and actuating said first flywheel; a second flywheel; a second change speed friction drive also comprising a rotatable friction wheel engaging and gliding on one side of said second flywheel; and means connecting said second rotatable friction wheel to be actuated by the turning movement of said table on said base and actuating said second flywheel, the speeds of said first and second flywheels being variable in accordance with the displacement of the respective friction wheels thereon, whereby the relative movement of the table and base may be steadied in a variable degree.

KARL SCHENCKE.